(12) United States Patent
Ogawa et al.

(10) Patent No.: US 7,793,529 B2
(45) Date of Patent: Sep. 14, 2010

(54) METHOD FOR PRODUCING A FORMED BODY USING A FORMING JIG

(75) Inventors: Masanobu Ogawa, Kasugai (JP); Yoshimasa Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/106,501

(22) Filed: Apr. 21, 2008

(65) Prior Publication Data

US 2008/0196470 A1    Aug. 21, 2008

Related U.S. Application Data

(62) Division of application No. 10/839,156, filed on May 6, 2004, now Pat. No. 7,396,223.

(30) Foreign Application Priority Data

May 20, 2003   (JP)   ............... 2003-141371

(51) Int. Cl.
  *B21C 23/04*   (2006.01)
  *B21C 25/00*   (2006.01)
(52) U.S. Cl. ............................ 72/264; 72/268
(58) Field of Classification Search ............ 72/264, 72/268, 261, 274, 258; 264/171.26, 171.27, 264/209.1
  See application file for complete search history.

(56) References Cited

U.S. PATENT DOCUMENTS

| 1,849,431 | A | | 3/1932 | Walter |
| 3,447,203 | A | * | 6/1969 | Campbell ............ 425/466 |
| 3,540,094 | A | * | 11/1970 | Janssen ................ 425/3 |
| 3,778,217 | A | | 12/1973 | Burstamante et al. |
| 4,413,968 | A | * | 11/1983 | Bliss .................. 425/198 |
| 6,206,675 | B1 | | 3/2001 | BeVier |
| 6,572,357 | B2 | * | 6/2003 | Bailey ................. 425/381 |
| 2001/0000634 | A1 | * | 5/2001 | Keehn et al. ........ 264/171.26 |

FOREIGN PATENT DOCUMENTS

| DE | 675280 | 5/1939 |
| EP | 0 248 560 | 12/1987 |
| GB | 1207952 A | 10/1970 |
| JP | 62-297110 | 12/1987 |
| JP | 63-141710 | 9/1988 |
| JP | 06-264105 A1 | 9/1994 |
| JP | 2001-247372 A1 | 9/2001 |
| JP | 2001-526129 A1 | 12/2001 |
| WO | WO 9222390 A1 * | 12/1992 |
| WO | 99/32277 A1 | 7/1999 |

* cited by examiner

*Primary Examiner*—Dana Ross
*Assistant Examiner*—Debra M Sullivan
(74) *Attorney, Agent, or Firm*—Burr & Brown

(57) ABSTRACT

A method for producing a formed body including the steps of introducing a fluid material supplied from two or more material supply holes of a rectification plate into a drawing die, homogenizing the flow rate distribution of the fluid material in the drawing die using one or more wires stretched from the material supply holes to near the exit section of the drawing die, and extruding the fluid material from the exit section of the drawing die in which a prescribed forming pattern is formed by two or more wires. The wires form hollow holes through the formed body.

9 Claims, 13 Drawing Sheets

METHOD FOR PRODUCING A FORMED BODY USING A FORMING JIG

CROSS REFERENCE TO RELATED APPLICATION

This application is a division of U.S. application Ser. No. 10/839,156, filed May 6, 2004, the entirety of which is incorporated herein by reference.

FIELD OF THE INVENTION

The present invention relates to a forming jig and a method for producing a formed body using the jig.

BACKGROUND OF THE INVENTION

As a method for producing a hollow rod-like body having an optional form and one or more hollow holes from ceramics, metals, or carbon, a method of forming a hollow rod-like body by press molding, cast molding, injection molding, rubber-press method, hot plate press method, or the like, and sintering the molded object or a method of providing a sintered object (rod-like body) with a certain external appearance and drilling a hollow hole through the sintered object by drill processing, electrical discharge machining, electrochemical processing (ECM processing), or the like has been employed.

These methods, however, involve a very complicated process and technical difficulty, resulting in poor productivity. This tendency is particularly conspicuous when narrowing the size of holes or producing hollow holes at a high density.

For this reason, a method of producing a hollow rod-like body (including a honeycomb structural object) having one or more hollow holes by forming a hollow extrusion material by extrusion molding using a special die or a special mouthpiece and sintering the extruded object has been mainly employed in recent years.

This method was successful in greatly improving productivity and optionally selecting the form and number of hollow holes by using a die.

However, since a material with a comparatively low viscosity is used in this method, the hollow holes are easily collapsed after extrusion molding. It has been difficult to constantly maintain a good quality. In particular, to produce a hollow rod-like body (including a honeycomb structural object) having fine hollow holes at a high density has been difficult due to the structure of dies. An additional problem has been a high production cost due to easily worn-out and very expensive dies.

To overcome the above problems, a method for producing a cellular honeycomb has been proposed. The method described in Published Japanese Translation of PCT Publication (WO 99/32777) for Patent Application No. 2001-526129, for example, comprises providing a cellular structure object (honeycomb structure object) containing two or more parallel channels having a predetermined section, filling the channels with a filler, and remodeling the cellular honeycomb structure by narrowing with a taper.

A method for producing a hollow rod-like body with a porous structure has been proposed in Japanese Patent Application Laid-Open No. 2001-247372, for example. The method comprises producing thin hollow rods of ceramic of which the hollow space is packed with a filler, bundling a plurality of such hollow rods and remodelling the bundled rods to form a bundle (optionally, again bundling the formed bundles and remodeling the rebundled objects), and extruding the bundle using a die and a plunger.

Another method that has been proposed by, for example, Japanese Patent Application Laid-Open No. 6-264105, produces a body to be sintered having a helical hole inside the section and a twist groove in the outer circumference. The method comprises extruding a kneaded plastic material from an extruder and causing the extruded material to pass through a torsion-imparting device and then through a metal die to obtain the body to be sintered.

The method of Published Japanese Translation of PCT Publication (WO 99/32277) for Patent Application No. 2001-526129 requires a step of packing and removing the filler after preparing a cellular structural object (honeycomb structural object), giving rise to an increase in the manufacturing cost for the filler and the die for the honeycomb structural object.

The method of Japanese Patent Application Laid-Open No. 2001-247372 has a problem of difficulty in producing rod-like bodies with fine linear holes for fabricating the hollow rod-like body with a porous structure. The method also requires a complicated procedure for remodeling and cannot produce cells at a high density.

The method of Japanese Patent Application Laid-Open No. 6-264105 can produce a hollow structure by extrusion molding, but can neither produce holes at a high density nor arrange the holes in a desired pattern. An additional problem with this method is a high mandrel production cost.

The present invention has been completed in view of the problems in the prior art mentioned above and has an object of providing a forming jig which can easily and inexpensively design or change the design of a forming pattern of hollow holes and the external configuration of a formed body, and can form fine hollow holes at a high density, and a method for producing a formed body using the jig.

SUMMARY OF THE INVENTION

Specifically, the present invention provides a forming jig comprising a rectification plate having two or more material supply holes, a drawing die installed below the rectification plate to define the external configuration of the formed body produced from a material, and a floating die in which one or more wires float vertically in the drawing die floating and stretch the exit section of the drawing die to form a hollow hole forming pattern.

In the above-described forming jig, the floating die is preferably installed on the upstream side or downstream side of the rectification plate and has one or more wires secured thereto.

It is desirable that the drawing die used in the present invention satisfy any one of the conditions (1)-(3):
(1) a tapered internal configuration,
(2) a freely variable exit section, and
(3) a cover-forming passage for forming an outer (peripheral) wall.

It is desirable that the floating die used in the present invention excel in wear resistance, can be flexibly deformed in accordance with a flow of the material, and exhibit almost no deformation in the exit section.

The floating die of the present invention is preferably connected with two or more wires on the upstream and downstream sides of the rectification plate and secured by welding or using an adhesive or a fixing jig. In addition, the floating die used in the present invention is preferably formed from wires having rigidities corresponding to the flowability of the material and/or the forming pattern.

The present invention further provides a method for producing a formed body comprising introducing a fluid material supplied from two or more material supply holes of a rectification plate into a drawing die, homogenizing the flow rate distribution of the fluid material in the drawing die using one or more wires stretched from the material supply holes to near the exit section of the drawing die, and extruding the fluid material from the exit section of the drawing die in which a prescribed forming pattern is formed by two or more wires, thereby causing the one or more wires to form hollow holes through the formed body.

It is desirable that the method for forming a formed body of the present invention satisfy any one of the following conditions (1)-(4).

(1) The drawing die has a tapered shape to control the flow rate distribution or slow down the flow rate of the fluid material, thereby stabilizing the forming pattern.

(2) The exit section of the drawing die is freely variable to change the external configuration and size of the formed body and hollow holes.

(3) The drawing die is provided with a cover-forming passage for forming an outer (peripheral) wall on the outermost (peripheral) side thereof to produce a formed body with an outer (peripheral) wall.

(4) The formed body is a laminate comprising multiple layers, each layer being formed from a fluid material different from that of adjacent layers, wherein a fluid material corresponding to each layer is introduced into each material supply hole in the rectification plate.

The formed body produced by the above method is preferably a hollow rod-like body with fine linear holes.

The hollow rod-like body with fine linear holes preferably has a cross-sectional dimension, in terms of diameter, of 0.1-1,000 mm. In addition, the rod-like body with fine linear holes preferably has a hollow hole density of 0.000001-100,000 holes/mm$^2$.

BRIEF DESCRIPTION OF THE DRAWINGS

FIGS. 3(a) to 3(d) are cross-sectional views showing major points of the forming jig of FIG. 1, wherein FIG. 3(a) is a cross-sectional view showing main parts along the line A-A, FIG. 3(b) is a cross-sectional view showing main parts along the line B-B, FIG. 3(c) is a cross-sectional view showing main parts along the line C-C, and FIG. 3(d) is a cross-sectional view showing main parts along the line D-D.

FIGS. 7(a)-(b) show an embodiment of the method for producing the formed body (with an outer (peripheral) wall) of the present invention, wherein FIG. 7(a) is a schematic longitudinal sectional view and FIG. 7(b) shows a sectional view of a main part of the formed body with an outer (peripheral) wall.

FIGS. 8(a)-(b) show another embodiment of the method for producing the formed body (multi-layer extrusion) of the present invention, wherein FIG. 8(a) is a schematic longitudinal sectional view and FIG. 8(b) shows a sectional view of a main part of the formed laminated body.

FIGS. 9(a)-(b) show still another embodiment of the method for producing the formed body (multi-layer extrusion) of the present invention, wherein FIG. 9(a) is a schematic longitudinal sectional view and FIG. 9(b) shows a sectional view of a main part of the formed laminated body.

FIGS. 10(a)-(c) show a further embodiment of the method for producing the formed body (using a variable drawing die) of the present invention, wherein FIG. 10(a) is a schematic longitudinal sectional view under normal conditions, FIG. 10(b) shows a schematic longitudinal sectional view under the conditions in which the variable drawing die is expanded to either side, and FIG. 10(c) shows a longitudinal sectional view of the resulting formed body.

FIGS. 11(a)-(c) show a further embodiment of the method for producing the formed body (using a variable drawing die and a variable floating die) of the present invention, wherein FIG. 11(a) is a schematic longitudinal sectional view under normal conditions, FIG. 11(b) shows a schematic longitudinal sectional view under the conditions in which the variable drawing die and variable floating die are expanded to either side, and FIG. 11(c) shows a longitudinal sectional view of the resulting formed body.

FIGS. 13(a)-(b) show an embodiment of the rectification plate (with a diffuser) used in the present invention viewed from the back, wherein FIG. 13(a) is a schematic longitudinal sectional view and FIG. 13(b) shows a sectional view of the main part of the formed laminated body.

FIGS. 14(a)-(b) show another embodiment of the rectification plate (without a diffuser) used in the present invention viewed from the back, wherein FIG. 14(a) is a schematic longitudinal sectional view and FIG. 14(b) shows a sectional view of the main part of the formed laminated body.

FIGS. 15(a)-(d) are longitudinal sectional views of examples of the unique shape wire used in the present invention, wherein FIG. 15(a) shows the manner in which the uniquely shaped part is attached, FIG. 15(b) shows a right-angled uniquely shaped part, FIG. 15(c) a cone-type uniquely shaped part, and FIG. 15(d) a low head-type uniquely shaped part.

FIGS. 16(a)-(c) show an embodiment of the floating die used in the present invention, wherein FIG. 16(a) is a schematic longitudinal sectional view, FIG. 16(b) shows a front view of the exit, and FIG. 16(c) is a sectional view of the main part of the formed body.

DETAILED DESCRIPTION OF THE INVENTION

Figure 1:
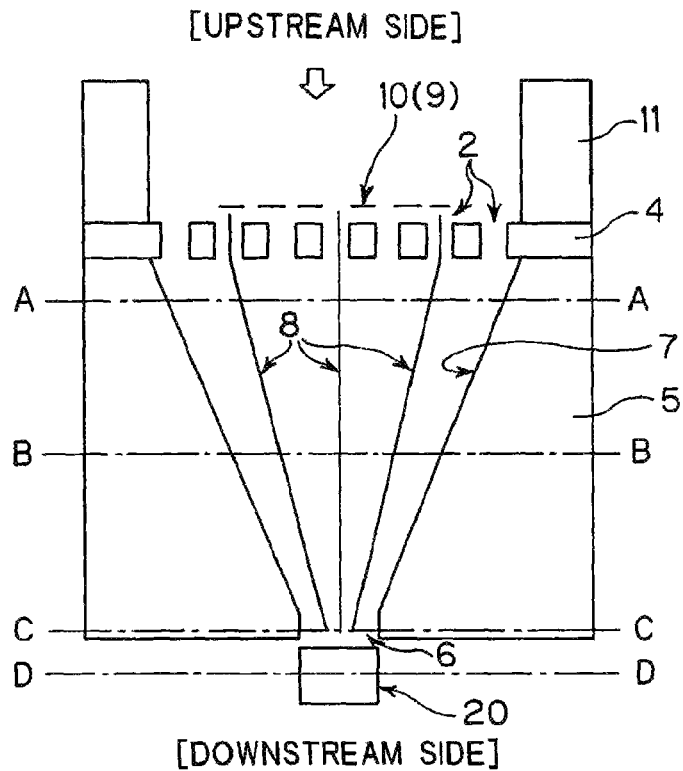
FIG. 1 is a longitudinal sectional view schematically showing an embodiment of the forming jig of the present invention.

The forming jig of the present invention comprises a rectification plate having two or more material supply holes, a drawing die installed below the rectification plate to define the external configuration of the formed body produced from a material, and a floating die in which one or more wires float vertically in the drawing die floating and stretch from the exit section of the drawing die to form a hollow hole forming pattern.

In the above-described forming jig, the floating die is preferably installed on the upstream side or downstream side of the rectification plate and has one or more wires secured thereto.

The method for producing a formed body using the above-described forming jig comprises introducing a fluid material supplied from two or more material supply holes of a rectification plate into a drawing die, homogenizing the flow rate distribution of the fluid material in the drawing die using two or more wires stretched from the material supply holes to near the exit section of the drawing die, and extruding the fluid material from the exit section of the drawing die in which a prescribed forming pattern is formed by two or more wires, thereby causing the one or more wires to form hollow holes through the formed body.

Due to the above-described constitution, the forming jig of the present invention can easily and inexpensively design or change the design of a forming pattern of hollow holes and the external configuration of the formed body without requiring a precision process using a conventional die or mouth ring. Furthermore, since the floating die and the drawing die are basically formed from separate and independent members, these dies can be maintained more easily and inexpensively than conventional dies or mouthpieces when worn out due to fluid materials.

In addition, since the flow rate distribution of the fluid material in the drawing die can be homogenized by one or more wires stretched from the material supply holes to near the exit section of the drawing die, not only can quality and precision of the formed body be improved, but also fluctuation of the quality of the formed bodies can be minimized (or the yield of the products can be increased).

Moreover, since hollow holes in the formed body are produced by wires in the forming jig of the present invention, a rod-like body with fine linear hollow holes or a formed body with fine hollow holes at a high density can be produced easily and inexpensively without requiring complicated steps as in conventional methods (see, for example, Published Japanese Translation of PCT Publication (WO 99/32277) for Patent Application No. 2001-526129 and Japanese Patent Application Laid-Open No. 2001-247372).

An embodiment of the present invention will be described below in detail referring to the drawings.

Figure 2:
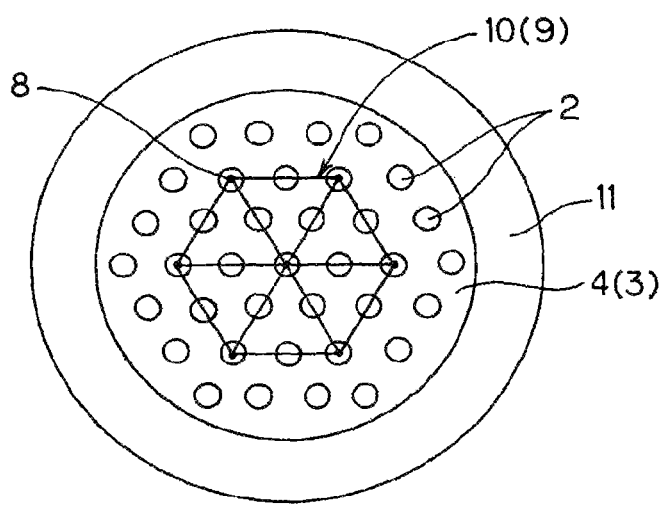
FIG. 2 is a schematic front view of FIG. 1.
Figure 3A:
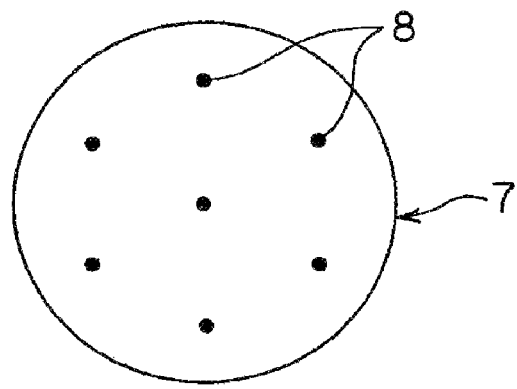
Figure 3B:
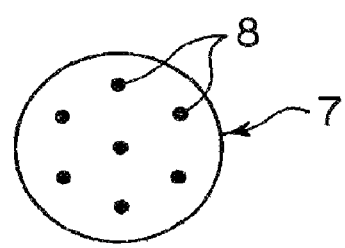
Figure 3C:
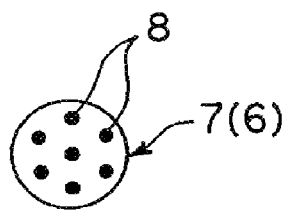
Figure 3D:
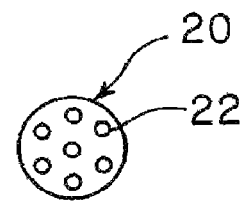

FIG. 1 is a longitudinal sectional view schematically showing an embodiment of the forming jig of the present invention. FIG. 2 is a schematic front view of FIG. 1. FIG. 3(a) to 3(d) are cross-sectional views showing major points of the forming jig of FIG. 1, wherein FIG. 3(a) is a cross-sectional view showing main parts along the line A-A, FIG. 3(b) is a cross-sectional view showing main parts along the line B-B, FIG. 3(c) is a cross-sectional view showing main parts along the line C-C, and FIG. 3(d) is a cross-sectional view showing main parts along the line D-D.

As shown in FIG. 1 and FIG. 2, the basic configuration of the forming jig of the present invention comprises a rectification plate 4 having two or more material supply holes 2, a drawing die 5 installed below the rectification plate 4 to specify the external configuration of the formed body 20 produced from the material, and a floating die 10 in which two or more wires 8 (seven in FIG. 2) float vertically in spaces 7 in the drawing die (forming pattern passages) and stretch from the exit section 6 of the drawing die 5 to form a hollow hole forming pattern.

As shown in FIG. 1, when a formed body 20 is manufactured using the forming jig, a fluid material supplied from two or more material supply holes 2 of the rectification plate 4 is introduced into the spaces 7 in the drawing die. Two or more wires 8 (seven in FIG. 1) stretch from the material supply holes 2 to near the exit of the drawing die to homogenize the flow rate distribution of the fluid material and, at the same time, make the pressure applied to the wires 8 even. This configuration can reduce the cross-sectional area of the fluid while retaining the similarity of the figure from the upstream side to the downstream side of the tapered inner space 7 of the drawing die as shown in FIGS. 3(a) to 3(c). The fluid material is extruded from the exit section 6 of the drawing die having a predetermined forming pattern, whereby a (cylindrical) formed body 20 having hollow holes 22 (seven in FIG. 3), as shown in FIG. 3(d), can be formed.

Figure 4:
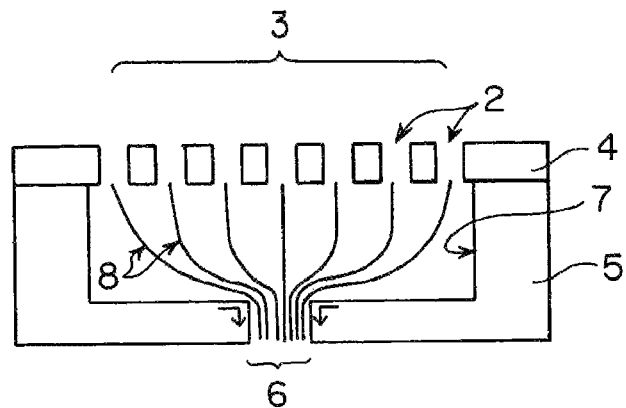
FIG. 4 is another longitudinal sectional view schematically showing an embodiment of the forming jig of the present invention.
Figure 5:
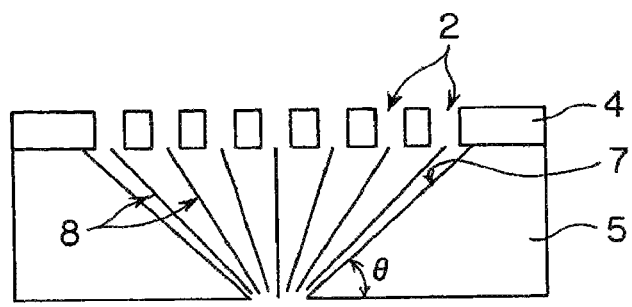
FIG. 5 is still another longitudinal sectional view schematically showing an embodiment of the forming jig of the present invention.
Figure 6:
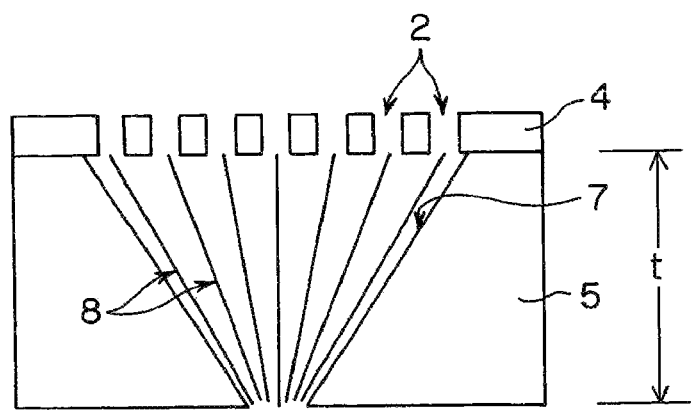
FIG. 6 is yet another longitudinal sectional view schematically showing an embodiment of the forming jig of the present invention.

In this instance, the manufacturing method of the formed body of the present invention may be varied according to the properties of the fluid material and the configuration of the formed body. For example, the forming pattern may be varied by greatly narrowing the exit section of the drawing die 5 as compared with the entrance section 3, thereby sharply increasing the pressure of the fluid material, as shown in FIG. 4. It is also possible to control the flow rate distribution of the fluid by changing the taper angle θ as shown in FIG. 5. Alternatively, it is possible to stabilize the forming pattern by expanding the distance t from the exit to the entrance of the drawing die and thereby slowing down the flow rate of the fluid as shown in FIG. 6.

Figure 7A:
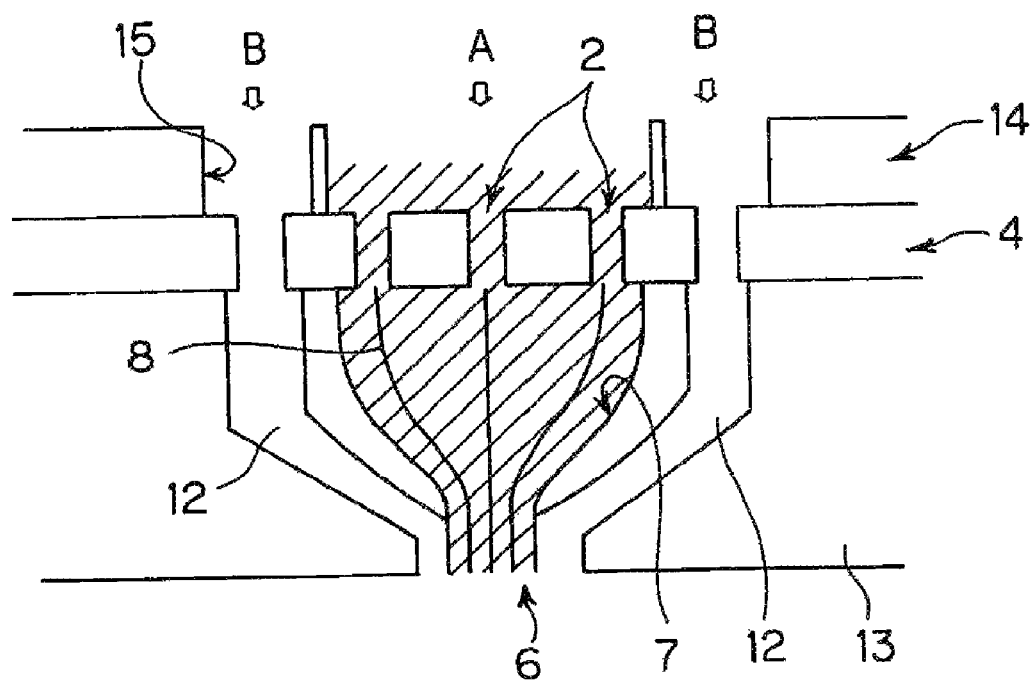
Figure 7B:
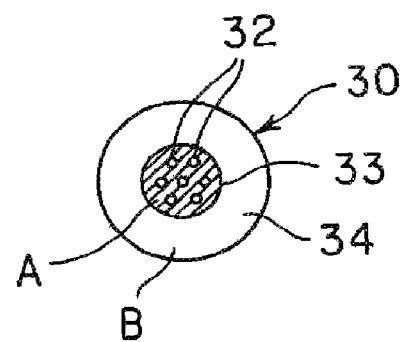

In the method for manufacturing the formed body of the present invention, a drawing die 13 provided with a cover-forming passage 12 around the pattern forming passage as shown in FIG. 7(a), for example, is used to obtain a formed body 30 (a cylinder in FIG. 7(b)) having a cover 34 (outer (peripheral) wall) with a prescribed thickness outside the forming pattern section 33 in which hollow holes 32 (seven in FIG. 7(b)) are formed.

In this instance, if the extrusion rate in the cover-forming passage 12 differs from the extrusion rate in the pattern forming passage 7 during extrusion molding of the fluid material, distortion and deficits may be produced in the outer cover 34 and the hollow hole 32 of the formed body 30 produced by extrusion. For this reason, the fluid material is supplied separately to the cover-forming passage 12 and the pattern forming passage 7 as shown in FIG. 7(a). At the same time, a control plate 14 to control the balance between the amount of the material supplied to the cover-forming passage 12 and the amount of the material supplied to the pattern-forming passage 7 is installed on the upstream side of the rectification plate 4, whereby the cover 34 (outer (peripheral) wall) and the forming pattern section 33 are optimized.

The fluid material A for the forming pattern section 33 and the fluid material B for the cover 34 (outer (peripheral) wall), shown in FIG. 7(a), may be either the same material or different materials.

Figure 8A:
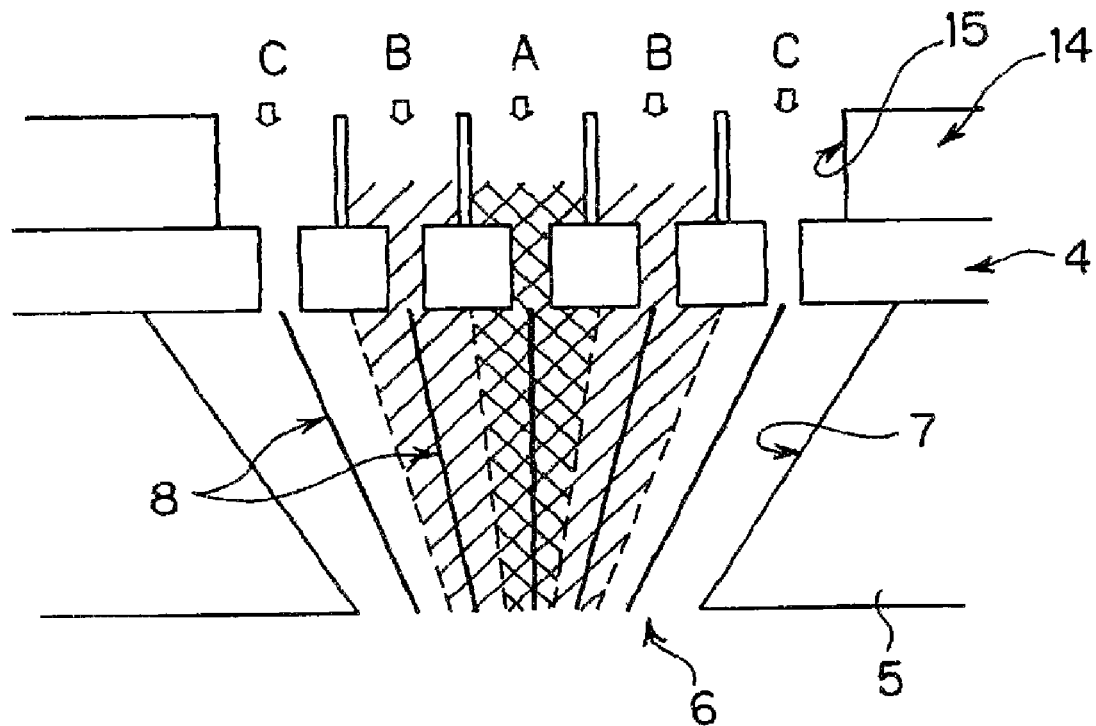
Figure 8B:
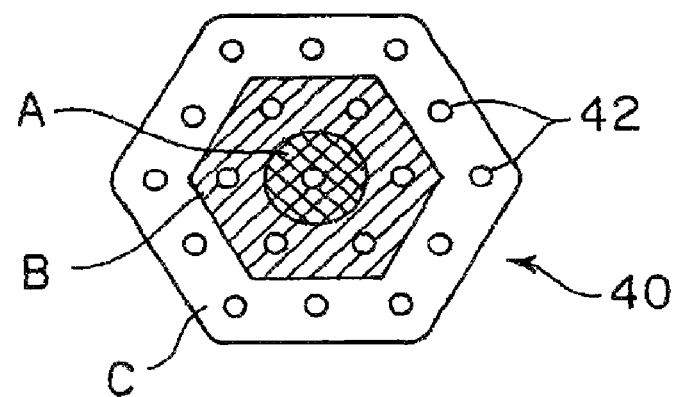

In addition, in the method for manufacturing the formed body of the present invention, as shown in FIG. 8(a), for example, the fluid materials A-C for each layer to be supplied to the material supply holes 2 in the rectification plate 4 may be distributed by the control plate 14 to obtain a laminate 40 (a hexagonal prism in FIG. 8(b)) consisting of two or more layers (three layers in FIG. 8(b)) from different materials and having a plurality of hollow holes 42 as shown in FIG. 8(b).

In this instance, the control plate 14 not only prevents dislocation of the interface of each layer in the laminate, but also prevents the surface of the formed laminated body from becoming wrinkled or distorted. For this reason, the fluid materials to be supplied to each material passage 2 are preferably separated by a material distributor 15 and the forming jig is preferably optimized to balance the amount of the material to be supplied to each material passage 2.

Figure 9A:
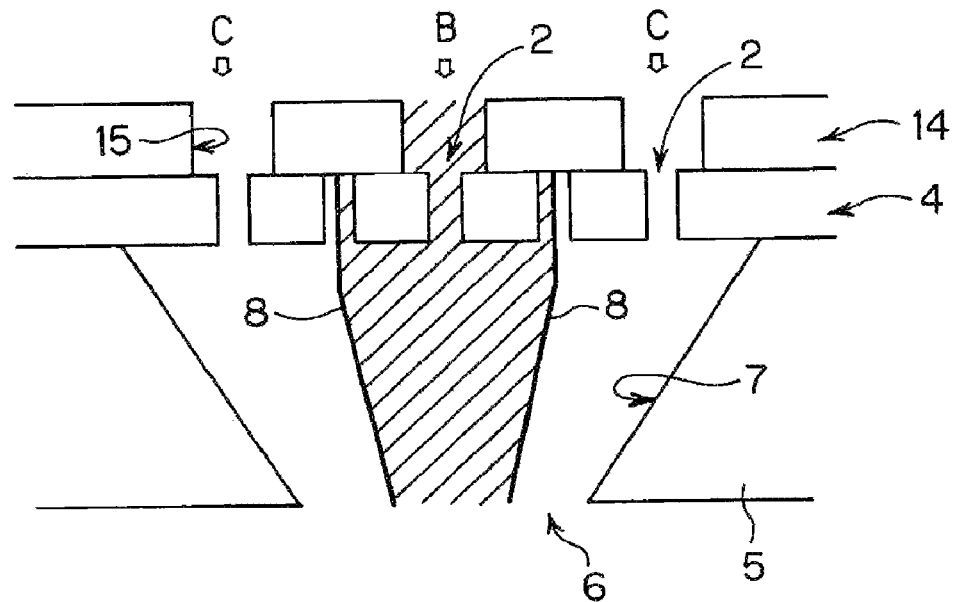
Figure 9B:
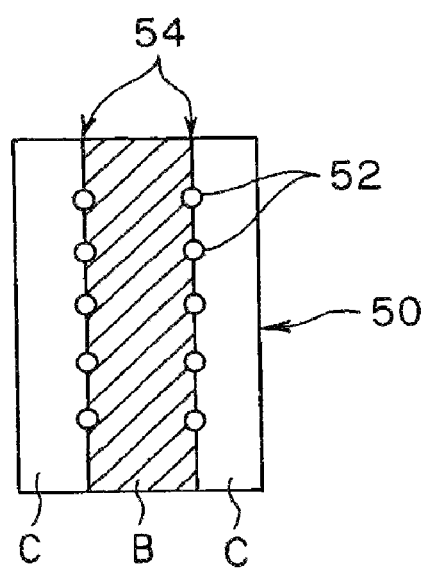

When a formed laminated body 50 (a quadratic prism in FIG. 9(b)) having hollow holes 52 located along the interface 54 of each layer (two layers in FIG. 9(b)) is desired, such a product can be obtained by installing a floating wire 8 on the interface and closing the material supply holes 2 by the control plate 14 as shown in FIG. 9(*a*).

Figure 10A:
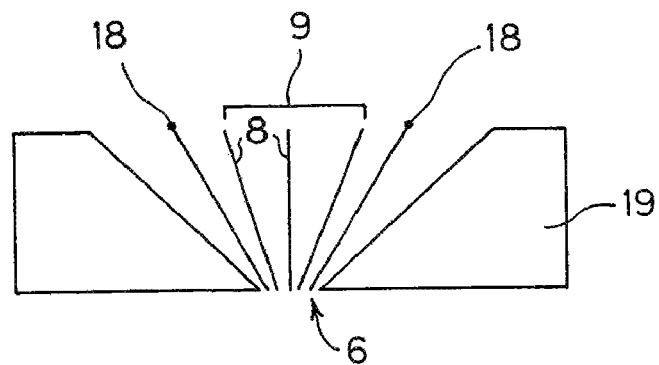
Figure 10B:
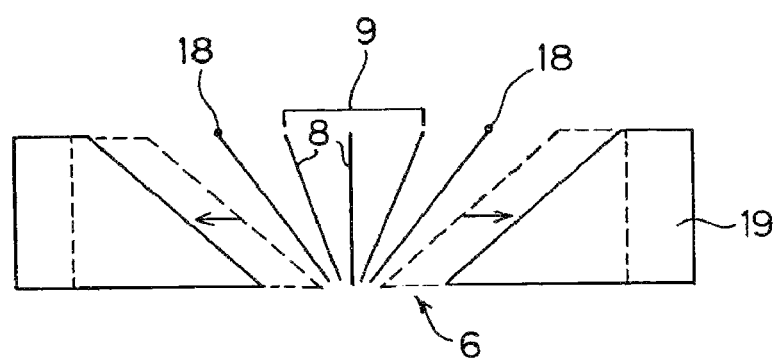
Figure 10C:
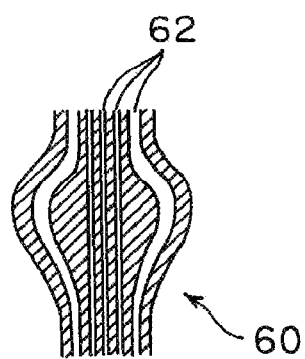

In addition, according to the method for fabricating a formed body of the present invention, it is possible to obtain a formed body 60 with a deformed external configuration and hollow holes 62 as shown in FIG. 10(*c*) by, for example, extruding a raw material first in the manner as shown in FIG. 10(*a*) and then, at an arbitrary point of time, varying the exit section 6 of the drawing die 19 to either sides as shown in FIG. 10(*b*).

Figure 11A:
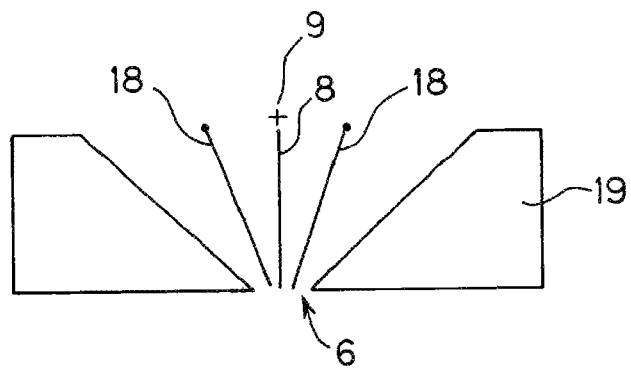
Figure 11B:
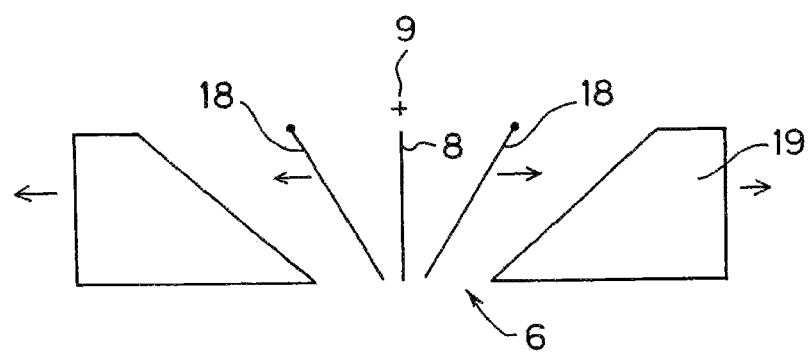
Figure 11C:
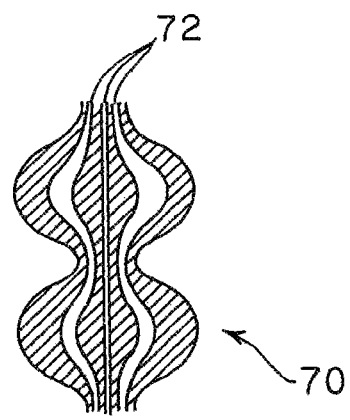

At this time, a formed body 70 with a further unique configuration (see FIG. 11(*c*)) can be obtained by varying not only the exit section 6 of the drawing die 19, but also the positions of floating-type movable wires 18 as shown in FIGS. 11(*a*), 11(*b*), and 11(*c*).

The forming jig and the method for producing a formed body using the jig can be particularly suitably used for extrusion molding of a cylindrical object with holes in the form of fine straight lines formed at a high density (rod-like body with fine linear holes), for example, a body having an external configuration with a cross-sectional dimension in terms of the diameter of 0.1-1,000 mm, hollow holes with a cross-sectional size in terms of the diameter of 0.001-990 mm, and a hollow hole density of 0.000001-100,000 holes/mm$^2$.

Major components of the forming jig of the present invention will now be explained in detail.

The drawing die used in the present invention defines the external configuration (outline) of the formed body. There are no specific limitations to the cross-sectional shape of the drawing die. A circle, square, triangle, hexagon, star, or (complicated) variant form can be appropriately selected according to the application, for example.

The drawing die used in the present invention preferably has a tapered internal shape to control the flow rate distribution or slow down the flow rate of the fluid material during extrusion molding, thereby stabilizing the forming pattern.

Since the drawing die used in the present invention has a freely variable exit section that can change the dimension (external and internal dimensions) of the formed body, one extrusion unit can form various formed bodies conforming to applications.

The drawing die used in the present invention may have a cover-forming passage to form an outer peripheral wall. Either an integral type as shown in FIG. 7(*a*) or a type provided with a separate cover-forming passage which can be combined with a common drawing die can be used.

The floating die used in the present invention has one or more wires floating vertically in the drawing die and stretching from the exit section of the drawing die to form a hollow hole forming pattern. This is installed on the upstream side (FIGS. 1 and 2) or the downstream side (FIGS. 4-6) of the rectification plate.

A floating die excelling in wear resistance, being flexibly deformed in accordance with a flow of the material, and exhibiting almost no deformation in the exit section is preferably used in the present invention (see FIG. 1).

In addition, the floating die used in the present invention is preferably formed from wires having rigidities corresponding to the flowability of the material and/or the forming pattern.

For example, it is possible to control escape of a fluid material from near the internal surface of the drawing die by providing the wire near the internal surface of the drawing die with a high rigidity. The external configuration of the resulting formed body can be excellently maintained in this manner.

The floating die used in the present invention is preferably connected with two or more wires 9 on the upstream and downstream sides of the rectification plate and secured by welding or using an adhesive or a fixing jig. The floating die may be combined with a partly variable floating die (see FIG. 11(*a*)(*b*)(*c*)).

Figure 12A:
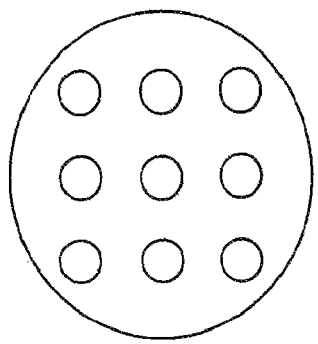
FIGS. 12(a)-(c) are schematic front views showing examples of the rectification plate used in the present invention.
Figure 12B:
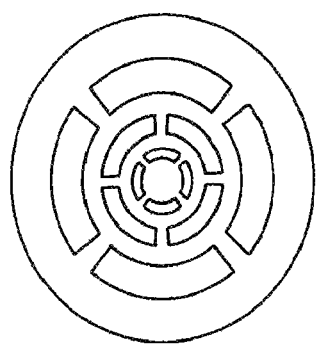
Figure 12C:
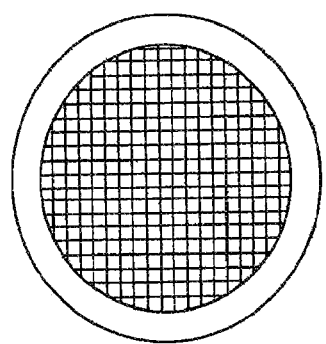

The rectification plate used in the present invention has two or more material supply holes which divide the drawing die into spaces (passages) or control the flow of a part of the fluid materials in the passages. The configuration of the rectification plate includes, but is not limited to, a multi-hole structure in which the holes in the shape of a rectangle, hexagon, or circle are arranged (see FIG. 12(*a*)), a unique-hole structure (see FIG. 12(*b*)), and a mesh structure (see FIG. 12(*c*)). An appropriate type is selected from these types.

Figure 13A:
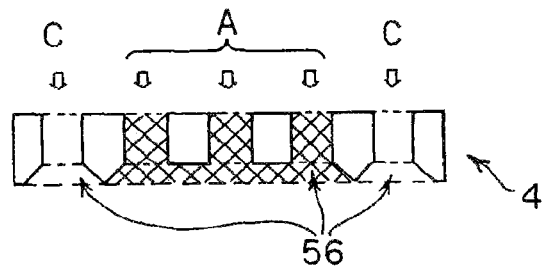
Figure 13B:
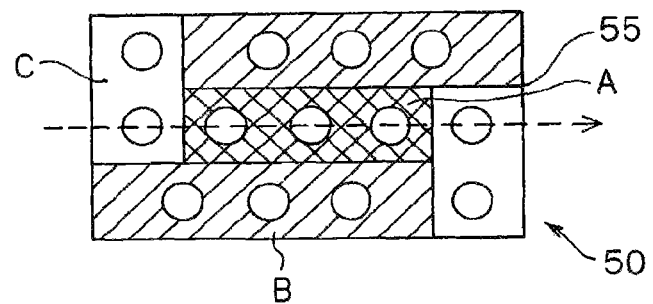
Figure 14A:
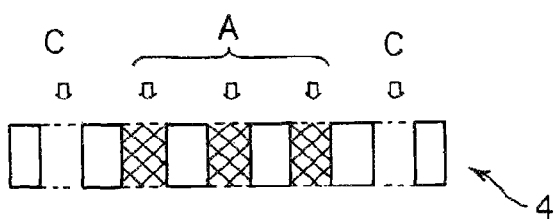
Figure 14B:
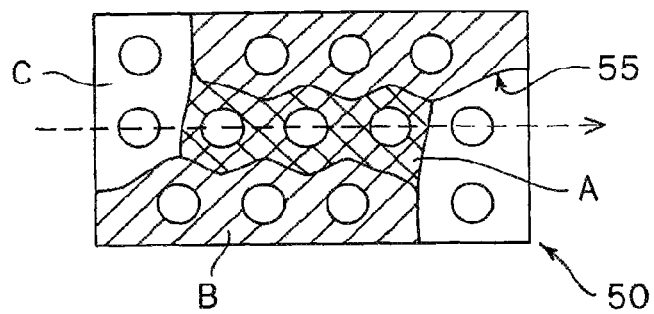
Figure 15A:
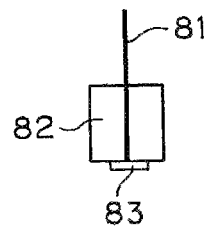
Figure 15B:
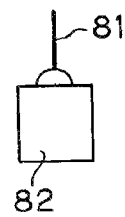
Figure 15C:
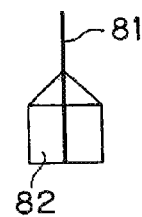
Figure 15D:
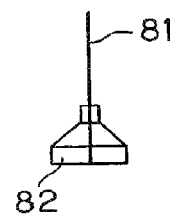

The rectification plate used in the present invention may be provided with a diffuser 56 on the downstream side as shown in FIG. 13(*a*) to clearly control the boundaries 55 of the layers (A-C) during multi-layer extrusion forming (see FIG. 13(*b*)) as compared with the rectification plate without a diffuser (see FIGS. 14(*a*) and 14(*b*)).

In addition, the rectification plate of the present invention is usually used in combination with a control plate to respond to various flow patterns.

The wire used in the present invention guides the fluid material in the direction in which the wires are projecting and controls the fluidity of the material in the same direction, thereby determining the shape of hollow holes during extrusion forming.

There are no specific limitations to the configuration of the wires used. Beside common-type wires, a wire with a uniquely shaped part on the tip (unique shape wire) and a type suspending a uniquely shaped body using two or more wires (a floating die) can be used.

The unique shape wire used in the present invention may comprise a uniquely shaped component 82 attached to the tip of the wire base 81 with a clasp 83 as shown, for example, in FIG. 15(*a*). Since the uniquely shaped component 82 may have an optional cross-sectional configuration as shown in FIGS. 15(*b*) to 15(*d*), not only is it possible to easily modify the floating die and to coat the floating die for providing wear resistance, but also it is possible to determine positions by adjusting a surrounding flowability.

A hard material (including a superhard alloy) is preferably used as the uniquely shaped component 82 in view of wear resistance.

Figure 16A:
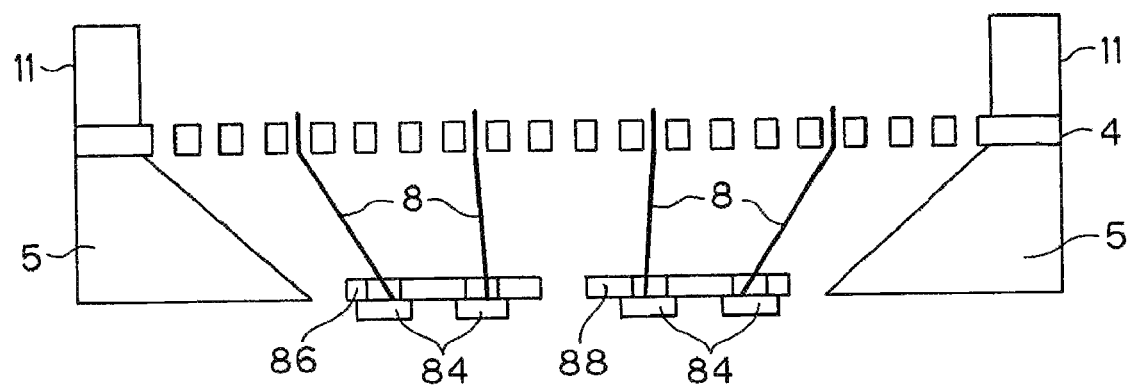
Figure 16B:
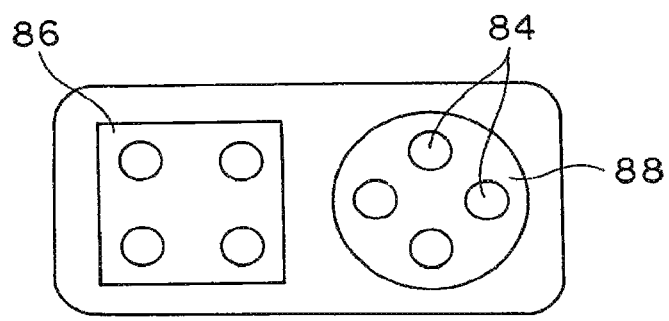
Figure 16C:
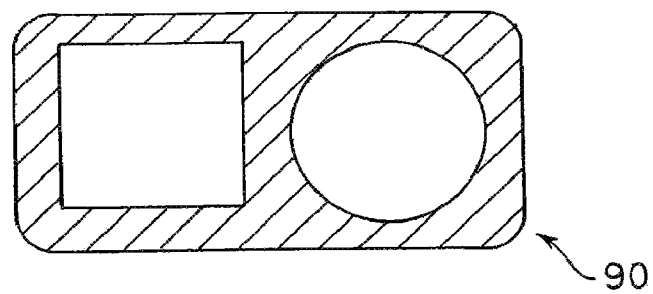

In the present invention, the thickness of the floating die can be reduced as shown in FIGS. 16(*a*), 16(*b*), and 16(*c*), for example. Not only can the molding pressure loss be reduced, but also the length of wires 8 can be adjusted using clamps 84, whereby it is possible to adjust the fluidity balance.

Moreover, the floating dies 86 and 88 used in the present invention may be worked into any optional form by laser beams or wire discharges, formed from a wear resistant material or ultrahard alloy, or provided with coating for ease of maintenance by washing and the like.

The cross-sectional configuration of the wire used in the present invention may be appropriately selected in accordance with the application from a circle, square, triangle, hexagon, star, and variant forms.

Although there are no specific limitations to the material of the wire used in the present invention inasmuch as the material has excellent wear resistance and provides the wire with an appropriate rigidity, the material is preferably nylon 66.

EXAMPLES

The present invention is described below in more detail by examples. However, the present invention is not limited to the following examples.

10 parts by weight of methylcellulose as a binder was added to 100 parts by weight of alumina particles with an average particle diameter of 10 μm. The mixture was kneaded using a kneader to produce a clay mixture.

A rectification plate with 127 holes, each having a diameter of 1.0 mm, arranged in the shape of a hexagon on a SUS plate with a diameter of 20 mm was placed on a drawing die having a tapered exit in the shape of a nozzle with a diameter of 2.0 mm.

A floating die with 19 wires made of nylon 66, each having a diameter of 0.2 mm, arranged in the shape of a hexagon was installed on the rectification plate with the wires being drawn out to the exit of the drawing die.

Figure 17:
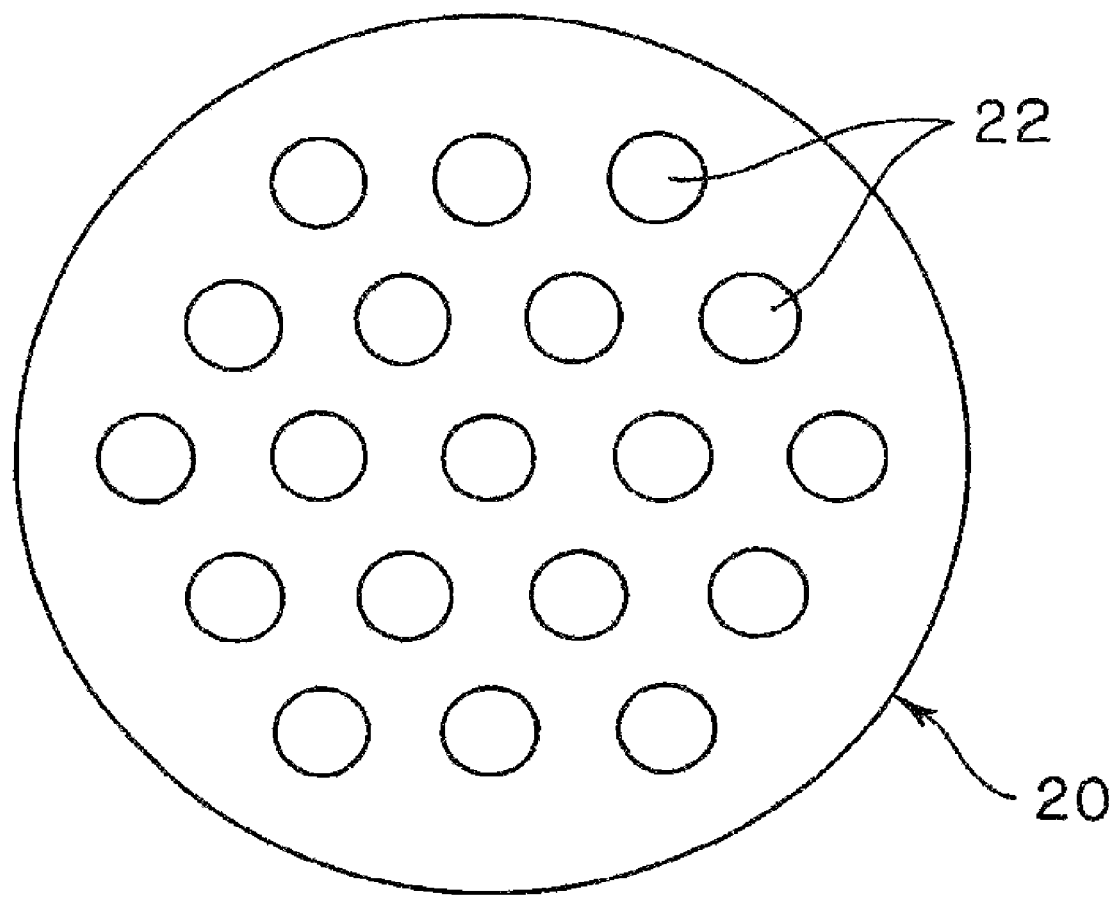
FIG. 17 is a sectional view of the main part of the formed body obtained in the example.

After installing a cylinder in front of the rectification plate, the clay mixture was charged into the cylinder. The clay mixture was extruded at a rate of 10 mm/sec using a piston, while cutting the extruded product to a length about 100 mm. The extruded material was dried in a dryer at a temperature of 120° C. for 10 minutes to obtain a formed body (a dry body) having an external diameter of 2.1 mm and 19 holes with a diameter of 0.2 mm (see FIG. 17).

The formed body was heated to 200° C. in one hour, maintained at 200° C. for one hour, heated to 300° C. in one hour, heated to 1,600° C. in six hours, and sintered at 1,600° C. for two hours. The sintered body was allowed to cool to room temperature.

Both end surfaces of the resulting sintered body was finished with a file and polish wastes were removed to obtain a complete body.

The obtained complete body was cut in every 5 mm interval to observe the cross-section to confirm that all holes were intact with neither adhesion to adjacent holes nor clogging.

As discussed above, the forming jig and the method for producing a formed body using the jig of the present invention can easily and inexpensively design or change the design of a forming pattern of hollow holes and the external configuration of the formed body, and can form fine hollow holes at a high density.

The forming jig and the method for producing a formed body using the jig of the present invention can achieve a great contribution to a wide spectrum of applications such as a column for chromatograph, ceramic filter, high speed heat exchanger, small reactor, metal composite material, cell structure object for fuel cells, separator, ink-jet nozzle, ceramic die, spinning die, burner nozzle, multi-channel liquid feed passage, lightweight ceramic component, heat insulating ceramic material, optical connector ferrule, and kitchen instrument such as pasta extruder.

What is claimed:

1. A method for producing a formed body comprising:
   introducing a fluid material supplied from two or more material supply holes of a rectification plate into a drawing die;
   homogenizing the flow rate distribution of the fluid material in the drawing die using one or more wires that float freely within and through one or more material supply holes of the rectification plate, respectively, and extend from the material supply holes to a location near an exit section of the drawing die; and
   extruding the fluid material from all of said material supply holes to the exit section of the drawing die in which a prescribed forming pattern is formed by one or more wires, thereby causing the one or more wires to form hollow holes through the formed body.

2. The method according to claim 1, wherein the drawing die has a tapered shape to control the flow rate distribution or slow down the flow rate of the fluid material, thereby stabilizing the forming pattern.

3. The method according to claim 1, wherein the exit section of the drawing die is freely variable to change the external configuration and size of the formed body and hollow holes.

4. The method according to claim 1, wherein the drawing die is provided with a cover-forming passage for forming an outer peripheral wall on the outermost peripheral side thereof, whereby the resulting formed body has an outer peripheral wall.

5. The method according to claim 1, wherein the formed body is a laminate comprising multiple layers, each layer being formed from a fluid material different from that of adjacent layers, the method comprising introducing a fluid material corresponding to each layer into each material supply hole in the rectification plate.

6. The method according to claim 1, wherein an external cross-sectional shape of the formed body is defined by a shape of the exit section of the drawing die, and an interior of the formed body includes fine linear holes.

7. The method according to claim 6, wherein the formed body has a cross-sectional dimension, in terms of diameter, of 0.1-1,000 mm.

8. The method according to claim 6, wherein the fine linear holes are hollow holes with a cross-sectional dimension, in terms of diameter, of 0.001-990 mm.

9. The method according to claim 6, wherein the hole density of the fine linear holes is 0.000001-100,000 holes/$mm^2$.

* * * * *